United States Patent [19]
Seckerson

[11] 3,771,275
[45] Nov. 13, 1973

[54] RETAINER FOR A HEADED MEMBER

[75] Inventor: Clifford Alexander Seckerson, Iver Heath, England

[73] Assignee: TRW Inc., Cleveland, Ohio

[22] Filed: Apr. 5, 1971

[21] Appl. No.: 131,316

[30] Foreign Application Priority Data
Apr. 8, 1970 Great Britain............... 16724/70

[52] U.S. Cl.............. 52/758 D, 52/756, 52/760, 24/73 HS
[51] Int. Cl.............................................. F16b 5/12
[58] Field of Search................... 287/20.926, 20 R, 287/189.35, 189.36 D; 85/8.8; 24/73 HS, 73 P; 52/489, 511, 506, 621, 383, 384, 390, 391; 156/92; 161/111, 114

[56] References Cited
UNITED STATES PATENTS

| 1,904,077 | 4/1933 | Place | 52/511 |
| 2,028,992 | 1/1936 | Place | 52/511 X |
| 2,379,595 | 7/1945 | Roe | 52/511 X |
| 3,249,973 | 5/1966 | Seckerson | 24/73 HS |
| 3,238,686 | 3/1966 | Pomeroy | 52/511 |
| 3,444,018 | 5/1969 | Hewitt | 156/92 X |
| 3,491,820 | 1/1970 | Ostling | 287/20.926 X |

FOREIGN PATENTS OR APPLICATIONS
781,653   4/1968   Canada................. 24/73 P Primary Examiner—Jordan Franklin
Assistant Examiner—Wayne L. Shedd
Attorney—Philip E. Parker, Gordon Needleman, James R. O'Connor and Hall & Houghton

[57]        ABSTRACT

A synthetic plastics disc-shaped retainer which can be adhered or welded on to a panel. The retainer is formed with a keyhole shaped slot which can lie wholly within the periphery of the or which can run out of an edge of the retainer. A recess is formed in the face of the retainer which is adhered to the panel and the recess is of greater transverse dimension than the keyhole slot whereby a stud or fastener having a flat head can be inserted in the keyhole slot so that the flat head is located in the recess behind the slot to attach the stud to the panel.

2 Claims, 5 Drawing Figures

PATENTED NOV 13 1973 3,771,275

INVENTOR
CLIFFORD ALEXANDER SECKERSON
BY
James R. O'Connor
ATTORNEY

RETAINER FOR A HEADED MEMBER

BACKGROUND TO THE INVENTION

The present invention relates to a retainer for use in attaching a headed member to an imperforate support surface.

It is known to attach two panels together with the aid of a fastener having a head which is engaged in a keyhole slot in one of the panels and a stud which is snap engaged through a circular aperture in the other panel. In certain conditions it is undesirable to perforate the first panel and the present invention provides a retainer formed with a keyhole shaped slot which can be quickly and permanently adhered to a face of a panel and which will thereafter accommodate and retain the head of a fastener.

STATEMENT OF THE INVENTION

According to one aspect of the present invention there is provided a retainer formed from a synthetic plastics material and comprising a substantially flat body having two substantially planar major faces, a generally keyhole shaped slot extending into one of the major faces comprising a narrow slot portion and an enlarged slot portion and a cavity behind the slot of greater dimensions than the slot at least in the region of the narrow slot portion.

According to a further aspect of the invention there is also provided an assembly of a panel attached to an apertured support with the aid of a stud fastener and a retainer as defined above, wherein the stud fastener comprises a flat head and a resilient shank joined to the head by a neck portion, the said other planar major face of the retainer is adhered to the panel, the flat head of the fastener is located within the cavity at one end of the keyhole shaped slot, the neck portion of the fastener extends through the slot and the resilient shank is engaged in the aperture, in the support to attach the panel to the support, the arrangement being such that the neck portion of the fastener is slidable along the keyhole shaped slot to trap the flat head of the fastener in the cavity.

According to yet a further aspect of the invention there is also provided a method of retaining a headed fastener on an imperforate panel with the aid of a retainer as defined above comprising the steps of coating the said other major planar face of the retainer and/or a part of the surface of the imperforate panel with an adhesive, bonding the said other major planar face of the retainer to the said surface of the imperforate panel and sliding the head of the fastener along the cavity in the retainer so that the head of the fastener is retained in the said cavity.

DESCRIPTION OF THE PREFERRED EMBODIMENTS

Figure 1:
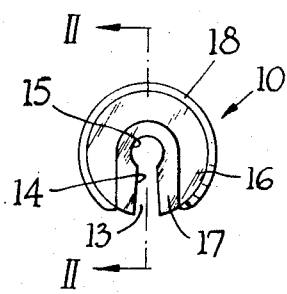
FIG. 1 is an underplan view of a retainer according to the present invention.
Figure 2:
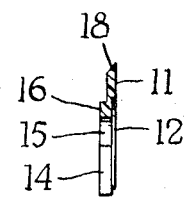
FIG. 2 is a section on the line II–II of FIG. 1.
Figure 3:
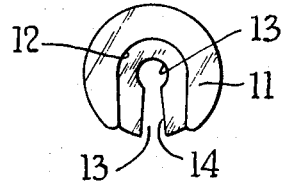
FIG. 3 is a plan view of the retainer.

In FIGS. 1 to 3, a retainer is indicated generally at 10 which is formed by injection moulding from a synthetic plastics material, such as polystyrene.

The retainer 10 is in the form of a substantially flat disc having a substantially planar major surface 11 formed with a U-shaped recess or cavity 12. A keyhole shaped slot 13 extends into one edge of the recessed portion and the slot 13 has a tapering entry 14 and a circular portion 15 which is coincident with the centre of the retainer. In order to strengthen the recessed portion of the retainer, the undersurface 16 has a raised portion 17 corresponding in shape to the recessed portion 12. The peripheral edge 18 of the disc is chamfered as shown best in FIG. 2, but this is optional and the edge may be cylindrical.

The retainer 10 is adapted for use with a panel formed from compressed fibre or hardboard and in order to attach the retainer 10 to such a panel, the panel is coated with a polyvinyl adhesive, the upper surface 11 of the retainer is laid against the adhesive and the adhesive is heated to bond the retainer to the panel by subjecting the adhesive to high frequency oscillations.

Figure 4:
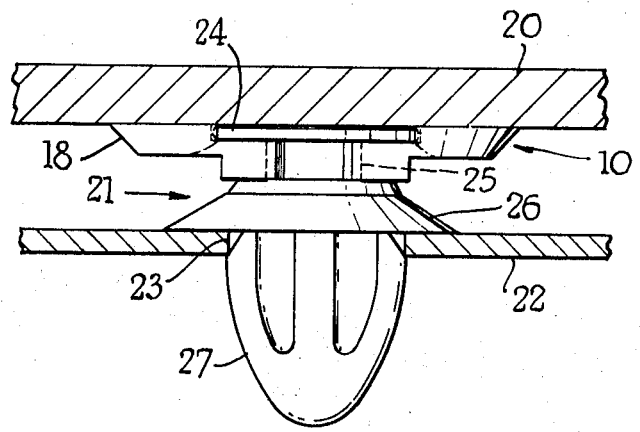
FIG. 4 is an elevation, partly in section, showing the retainer adhered to a trim pad which is attached to an apertured support panel with the aid of a fastener.

The retainer 10 is shown in FIG. 4 attached, in the manner described above, to a trim pad 20 which is attached with the aid of a fastener 21 to a support panel 22 formed with a circular aperture 23.

The fastener 21 comprises a flat circular head 24, a cylindrical neck 25, a flexible skirt 26 and a resilient stud 27.

In order to attach the trim pad 20 to the panel 22, the head 24 of the fastener 21 is located within the cavity 12 of the retainer and the neck portion 25 of the fastener is passed along the tapered entry 14 of the slot 13 until it snaps into the circular portion 15 of the head. The fastener is thereafter securely trapped by the retainer against the trim pad 20 and can only be removed by applying a sufficient force to snap the neck portion 25 of the fastener out of the circular portion 15 of the slot 13 and into the tapered portion of the slot.

When the fastener 21 is attached to the trim pad in this manner, the trim pad is brought up to the panel 22 and the stud portion 27 of the fastener is snap-engaged through the circular aperture 23 in the support 22 until the skirt 26 is flexed against the outer surface of the panel 22 to form a seal around the aperture 23.

It will be appreciated that a plurality of the retainers 10 can be adhered at intervals around the periphery of the trim pad 20, to provide a secure connection between the trim pad and the support panel 22.

The retainer 10 can be formed from an suitable synthetic plastics material and can be adhered to the trim pad with the aid of any suitable adhesive. It will be appreciated that the type of adhesive used will depend upon the type of plastics material from which the retainer is formed, some adhesives being more suitable for use with certain synthetic plastics than others.

Figure 5:
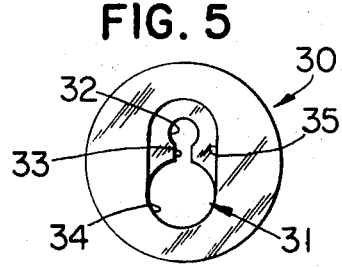
FIG. 5 is an underplan view of a modification of the retainer shown in FIG. 1.

A modification of the retainer 10 is indicated generally at 30 in FIG. 5. The retainer 30 is similar to the retainer 10 except that it is formed with a keyhole shaped slot 31 which is closed at both ends and which does not run out of the edge of the retainer 30. The slot 31 includes a narrow portion 32, a neck portion 33 and an enlarged part-circular portion 34, the portions 32 and 33 being surrounded by a cavity 35 which extends into the body of the retainer from the upper major face. In use the retainer 30 is adhered to a trim pad in the same manner as the retainer 10 and the fastener 21 is then attached to the retainer by passing the head 24 of the fastener through the enlarged portion 34 of the slot and sliding the neck 25 of the fastener through the neck portion 33 of the slot into the narrow portion 32. Thereafter the head of the fastener is retained in the cavity 35 to secure the fastener to the trim pad.

Further minor modifications can be made to the above described embodiment without departing from the spirit and scope of the invention which is best described in the following claims.

I claim:

1. An assembly of a panel attached to an apertured support by means of a retainer and a cooperating stud fastener, said retainer being formed from a synthetic plastic material and including a body having two substantially planar major faces, one of said planar major faces being adhered to said panel, said body having a recess formed therein and extending axially inwardly from said one planar major face and cooperating with said panel to define a stud head receiving cavity, a raised portion extending outwardly from said body adjacent said other major planar face, said raised portion being disposed substantially opposite said recess, and an open end keyhole slot formed in said body and said raised portion, said slot being in axial communication with said recess and having a narrow portion leading from its open end to an enlarged portion disposed generally centrally of said retainer; said stud fastener comprising a flat head, a shank depending from said head, said shank including an upper, substantially rigid, neck portion and a lower resilient support engaging portion, and an intermediate radially extending flange joined to said shank adjacent said neck portion, but axially spaced from said head, said flange having a substantially rigid planar section disposed immediately adjacent said neck portion, said head of said stud fastener being seated in said stud receiving cavity and within said recess in said retainer body and said neck portion of said stud shank being snap seated in said enlarged portion of said keyhole slot and extending axially through said slot, said raised portion of said retainer being seated against the proximate surface of said substantially rigid section of said stud flange to firmly axially tension said stud head against said retainer, and said stud shank resilient portion being snap seated in said apertured support, thereby fixing said panel to said support in overlying, but axially spaced, relationship to one another.

2. An assembly according to claim 1 wherein said flange on said stud fastener additionally includes a relatively flexible skirt depending from said planar section and flaring radially outwardly relative to the vertical axis of said shank, said flexible skirt being tensioned against the surface of said support proximate said panel and cooperating with said resilient portion of said stud shank to tension said shank against said support and providing a peripheral seal about the aperture in said support.

* * * * *